United States Patent
Oishi

(10) Patent No.: US 10,860,818 B2
(45) Date of Patent: Dec. 8, 2020

(54) COMMUNICATION APPARATUS, COMMUNICATION METHOD, AND COMPUTER PROGRAM

(71) Applicant: TOSHIBA TEC KABUSHIKI KAISHA, Tokyo (JP)

(72) Inventor: Sadatoshi Oishi, Fuji Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 23 days.

(21) Appl. No.: 16/416,684

(22) Filed: May 20, 2019

(65) Prior Publication Data
US 2019/0392183 A1 Dec. 26, 2019

(30) Foreign Application Priority Data
Jun. 20, 2018 (JP) .................................. 2018-117073

(51) Int. Cl.
*G06K 7/10* (2006.01)
*G01S 13/26* (2006.01)

(52) U.S. Cl.
CPC .......... *G06K 7/10366* (2013.01); *G01S 13/26* (2013.01); *G06K 7/10316* (2013.01); *G06K 7/10376* (2013.01); *G06K 7/10435* (2013.01)

(58) Field of Classification Search
CPC .......... G06K 7/10366; G06K 7/10376; G06K 7/10435; G06K 7/10316; G01S 13/26; G01S 5/14; G01S 19/43
See application file for complete search history.

(56) References Cited

U.S. PATENT DOCUMENTS

| | | | | |
|---|---|---|---|---|
| 4,370,653 A | * | 1/1983 | Crowley | G01S 13/82 342/103 |
| 4,604,733 A | * | 8/1986 | Brown | G01S 15/74 342/145 |

(Continued)

FOREIGN PATENT DOCUMENTS

| | | |
|---|---|---|
| CN | 102281084 A | 12/2011 |
| CN | 107688762 A | 2/2018 |

(Continued)

OTHER PUBLICATIONS

U.S. Appl. No. 16/211,491, filed Dec. 6, 2018, Nobuo Murofushi.
(Continued)

*Primary Examiner* — Daniel I Walsh
(74) *Attorney, Agent, or Firm* — Foley & Lardner LLP

(57) ABSTRACT

A communication apparatus includes an antenna, a detecting section, and a determining section. The antenna receives a radio wave transmitted from a wireless tag. The detecting section detects a phase of the radio wave. The determining section determines that the wireless tag is present outside a predetermined range if a phase difference between a phase measured if a relative position of the antenna with respect to the wireless tag is a first position within a first range and a phase measured if the relative position is a second position within the first range is smaller than a threshold or if a phase difference between a phase measured if the relative position is a third position within a second range different from the first range and a phase measured if the relative position is a fourth position within the second range is smaller than the threshold.

6 Claims, 14 Drawing Sheets

(56) References Cited

U.S. PATENT DOCUMENTS

| | | | | |
|---|---|---|---|---|
| 6,868,073 | B1* | 3/2005 | Carrender | G01S 13/84 340/572.1 |
| 8,648,767 | B2 | 2/2014 | Takahashi | |
| 10,101,435 | B1* | 10/2018 | Farrell | G01S 17/08 |
| 10,290,936 | B2* | 5/2019 | Oishi | H01Q 9/0428 |
| 10,650,346 | B1* | 5/2020 | Pesavento | G06K 7/10366 |
| 10,679,203 | B2 | 6/2020 | Murofushi | |
| 10,739,452 | B2* | 8/2020 | Khojastepour | G01S 5/0278 |
| 2003/0030568 | A1* | 2/2003 | Lastinger | G07C 9/28 340/8.1 |
| 2004/0054471 | A1* | 3/2004 | Bartlett | A01K 15/027 701/519 |
| 2005/0206555 | A1* | 9/2005 | Bridgelall | G01S 13/878 342/127 |
| 2006/0044147 | A1* | 3/2006 | Knox | G01S 5/12 340/686.1 |
| 2007/0273526 | A1* | 11/2007 | Fukasawa | G06K 7/10356 340/572.7 |
| 2007/0282482 | A1* | 12/2007 | Beucher | G06Q 10/08 700/225 |
| 2008/0150699 | A1* | 6/2008 | Ohara | H04B 17/27 340/10.4 |
| 2009/0280742 | A1 | 11/2009 | Schantz et al. | |
| 2009/0303005 | A1* | 12/2009 | Tuttle | G06K 7/10316 340/10.1 |
| 2010/0039228 | A1* | 2/2010 | Sadr | G06K 7/10366 340/10.1 |
| 2010/0039231 | A1 | 2/2010 | Fuchs et al. | |
| 2010/0109914 | A1* | 5/2010 | Tieman | G08G 1/205 340/991 |
| 2011/0090062 | A1* | 4/2011 | Hofer | G01S 13/75 340/10.31 |
| 2011/0109440 | A1* | 5/2011 | Muehlmann | G01S 13/84 340/10.1 |
| 2012/0098643 | A1* | 4/2012 | Gunther | G06K 7/10356 340/10.1 |
| 2013/0201003 | A1* | 8/2013 | Sabesan | G06K 19/0723 340/10.1 |
| 2014/0022059 | A1* | 1/2014 | Horst | G06K 7/10009 340/10.3 |
| 2014/0167920 | A1* | 6/2014 | Kamiya | G01S 13/76 340/10.1 |
| 2014/0266609 | A1* | 9/2014 | Yang | G06K 7/10366 340/8.1 |
| 2015/0302708 | A1* | 10/2015 | Hattori | G06K 7/10009 705/16 |
| 2018/0004992 | A1* | 1/2018 | Jacobsen | G06K 7/10435 |
| 2018/0247094 | A1* | 8/2018 | Khojastepour | G01S 13/38 |
| 2019/0102584 | A1* | 4/2019 | Enomoto | G01S 13/758 |
| 2019/0180062 | A1* | 6/2019 | Murofushi | G06K 7/10366 |
| 2019/0180063 | A1* | 6/2019 | Suzuki | G06K 7/10009 |
| 2019/0236323 | A1* | 8/2019 | Trivelpiece | G08B 13/2417 |
| 2019/0392183 | A1* | 12/2019 | Oishi | G06K 7/10356 |
| 2020/0125808 | A1* | 4/2020 | Yaginuma | G06Q 10/08 |

FOREIGN PATENT DOCUMENTS

| | | |
|---|---|---|
| EP | 2 779 020 A2 | 9/2014 |
| EP | 3 287 937 A2 | 2/2018 |
| JP | 2005-247566 A | 9/2005 |
| JP | 2009-289297 A | 12/2009 |
| JP | 2011-180912 A | 9/2011 |
| WO | WO-2015/148509 A1 | 10/2015 |

OTHER PUBLICATIONS

Search Report dated Nov. 15, 2019 received in corresponding European patent application No. 19 18 1304.7, 6 pages.
First Office Action issued in Chinese Patent Application No. 201910491239.6 dated Aug. 3, 2020.

\* cited by examiner

COMMUNICATION APPARATUS, COMMUNICATION METHOD, AND COMPUTER PROGRAM

CROSS-REFERENCE TO RELATED APPLICATION

This application is based upon and claims the benefit of priority from Japanese Patent Application No. 2018-117073, filed in Jun. 20, 2018, the entire contents of which are incorporated herein by reference.

FIELD

Embodiments described herein relate generally to a communication apparatus, a communication method, and a computer program.

BACKGROUND

In recent years, there has been an increasing number of stores where a self-checkout apparatus (a self-point of sale (POS) apparatus or a self-register apparatus) or a semi-self-checkout apparatus (a semi-self-POS apparatus or a semi-self-register apparatus) for the customer himself or herself to perform registration of commodities to be purchased is provided. The stores adopt a sales form in which the customer registers the commodities to be purchased.

In general, in such a checkout apparatus, the customer scans code symbols such as barcodes or two-dimensional codes attached to commodities with a scanner one by one and performs sales registration of the commodities. Therefore, the customer has to find out, for each of the commodities, a code symbol of the commodity and adjust the directions of the code symbol and the scanning of the scanner every time. Such an operation is a burden for the customer. If the number of commodities to be registered increases, the burden of the customer also increases according to the increase in the number of commodities.

Therefore, the sales registration takes time, causing a deterioration in processing efficiency in the self-checkout apparatus or the semi-self-checkout apparatus.

Accordingly, a part of the stores introduces a check-out apparatus that collectively reads commodity information such as commodity codes from wireless tags such as radio frequency identifier (RFID) tags attached to a plurality of commodities and performs sales registration and accounting process based on the commodity information. Such a checkout apparatus includes, for example, a reading device that can read commodity information from wireless tags attached to a plurality of commodities placed on the upper surface of a checkout counter in which a flat antenna is embedded.

Such a reading device includes a shield box or the like that blocks a radio wave not to inadvertently read a wireless tag in the periphery such as a wireless tag held by a shopper present nearby or a wireless tag put on an adjacent reading device. Therefore, the size of the device increases and cost in constructing a system increases. It takes time for an operator such as a customer to put in articles such as commodities in the shield box and take out the commodities from the shield box.

DETAILED DESCRIPTION

Figure 1:
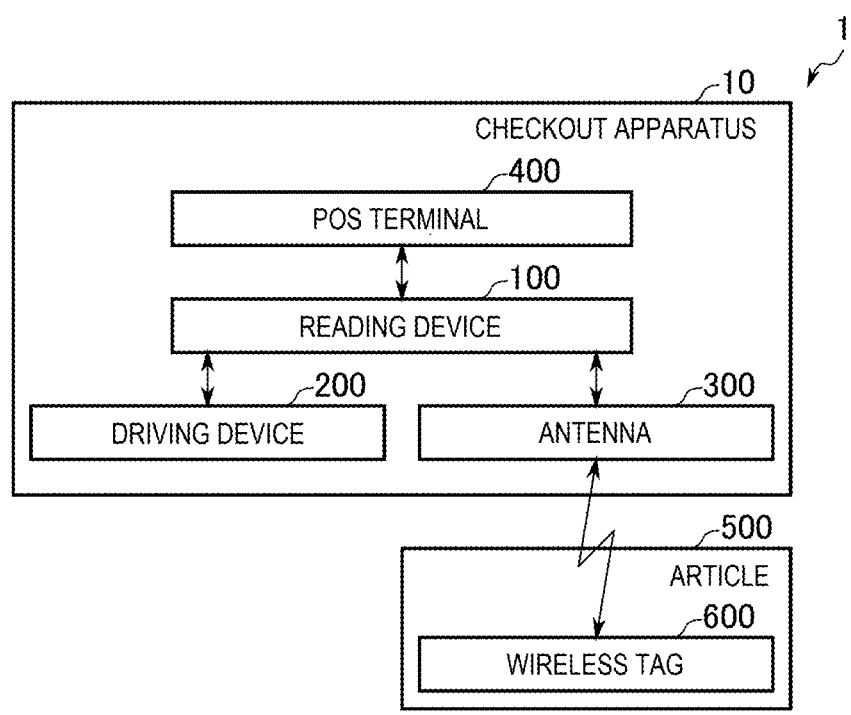
FIG. 1 is a block diagram illustrating an example configuration of a checkout system according to an example embodiment.

According to one embodiment, a shield box or the like is made unnecessary by providing a communication apparatus, a communication method, and a computer program.

A communication apparatus according to an embodiment includes an antenna, a detecting section, and a determining section. The antenna receives a radio wave transmitted from a wireless tag. The detecting section detects a phase of the radio wave received by the antenna. The determining section determines that the wireless tag is present outside a predetermined range if a phase difference between a phase measured if a relative position of the antenna with respect to the wireless tag is a first position within a first range and a phase measured if the relative position is a second position within the first range is smaller than a threshold or if a phase difference between a phase measured if the relative position is a third position within a second range different from the first range and a phase measured if the relative position is a fourth position within the second range is smaller than the threshold.

A checkout system according to an embodiment is explained below with reference to the drawings. In the drawings used for the explanation of the embodiment below, scales of sections are sometimes changed as appropriate. In the drawings, components are sometimes simplified and illustrated for explanation.

FIG. 1 is a block diagram illustrating an example configuration of a checkout system 1 according to an example embodiment. The checkout system 1 is a system for performing registration of commodities and settlement concerning the registered commodities. As an example (e.g., in various embodiments, etc.), the checkout system 1 includes a checkout apparatus 10 and a wireless tag 600. The checkout apparatus 10 is a device that performs registration of commodities and settlement concerning the registered commodities. As an example, the checkout apparatus 10 includes a reading device 100, a driving device 200, an antenna 300, and a POS terminal 400.

Figure 2:
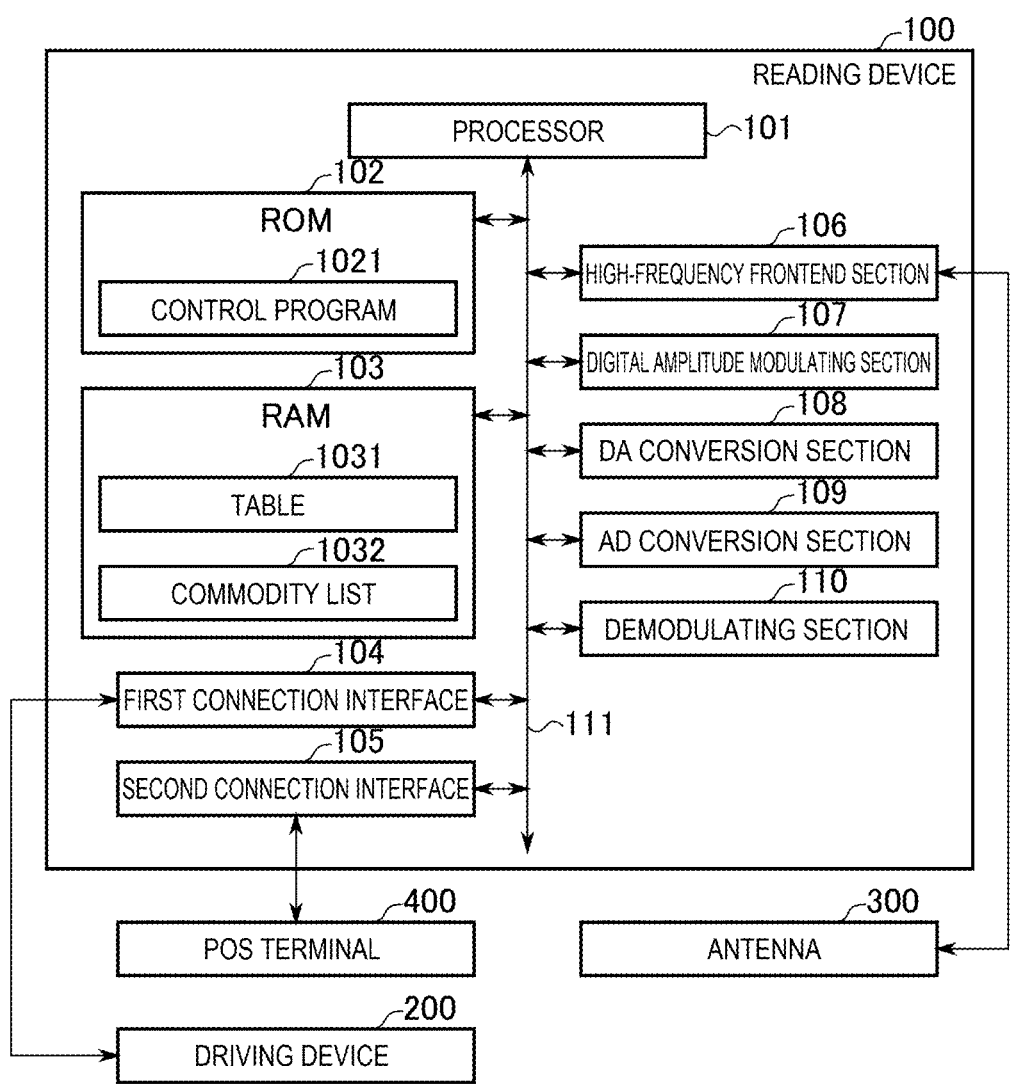
FIG. 2 is a block diagram illustrating a circuit configuration of a reading device of the checkout system illustrated in FIG. 1.

The reading device 100 is explained with reference to FIG. 2. FIG. 2 is a block diagram illustrating a circuit configuration of the reading device 100. The reading device 100 is a device that controls the driving device 200 and the antenna 300 and reads commodity information such as a commodity code from the wireless tag 600. A commodity code is an identification sign uniquely given to each of commodities. As an example, the reading device 100 includes a processor 101, a read-only memory (ROM) 102, a random-access memory (RAM) 103, a first connection interface 104, a second connection interface 105, a high-frequency frontend section 106, a digital amplitude modulating section 107, a digital to analog (DA) conversion section 108, an analog to digital (AD) conversion section 109, and a demodulating section 110. These sections are connected by a bus 111 or the like. The reading device 100 is an example of a communication device.

The processor 101 is equivalent to a central part of a computer that performs processes such as an arithmetic operation and control necessary for the operation of the reading device 100. The processor 101 controls the sections based on computer programs such as system software, application software, or firmware stored in the ROM 102 or the like in order to realize various functions of the reading device 100. The processor 101 may be, for example, a central processing unit (CPU), an micro processing unit (MPU), an SoC system on a chip (SoC), a digital signal processor (DSP), a graphics processing unit (GPU), an application specific integrated circuit (ASIC), a programmable logic device (PLD), or an field-programmable gate array (FPGA). Alternatively, the processor 101 is a combination of a plurality of devices among these devices.

The ROM 102 is equivalent to a main storage device of the computer including the processor 101 as the central part. The ROM 102 is a nonvolatile memory exclusively used for readout of data. The ROM 102 stores the computer programs explained above. The ROM 102 stores data, various setting values, or the like used by the processor 101 in performing various kinds of processes.

The computer programs stored in the ROM 102 include a control program 1021 for executing processes explained below. As an example, the reading device 100 is transferred to an administrator or the like of the reading device 100 in a state in which the control program 1021 is stored in the ROM 102. However, the reading device 100 may be transferred to the administrator or the like in a state in which the control program 1021 is not stored in the ROM 102. The reading device 100 may be transferred to the administrator or the like in a state in which a program different from the control program 1021 is stored in the ROM 102. The control program 1021 may be separately transferred to the administrator or the like and written in the ROM 102 under operation by the administrator, a serviceperson, or the like. The transfer of the control program 1021 at this time can be realized by, for example, recording the control program 1021 in a removable storage medium such as a magnetic disk, a magneto-optical disk, an optical disk, or a semiconductor memory or downloading the control program 1021 via a network such as the Internet or a local area network (LAN).

The RAM 103 is equivalent to the main storage device of the computer including the processor 101 as the central part. The RAM 103 is a memory used for reading and writing of data. The RAM 103 is used as a so-called work area or the like in which data temporarily used by the processor 101 in performing the various kinds of process is stored.

As an example, the RAM 103 stores a table 1031 and a commodity list 1032.

Figure 3:
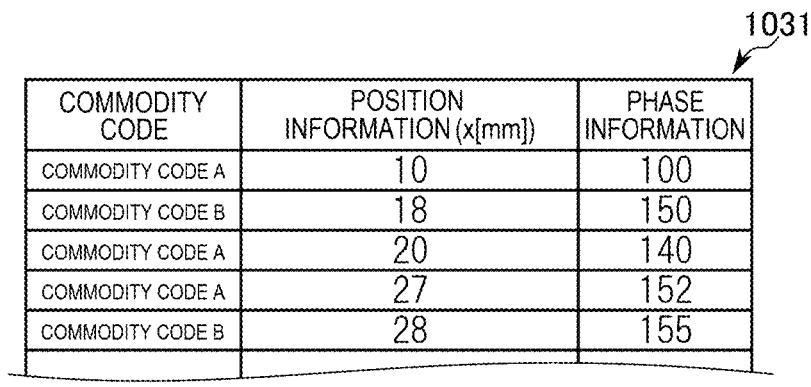
FIG. 3 is a diagram illustrating an example of a data configuration of a table used by the reading device illustrated in FIG. 2.

As an example, the table 1031 has a configuration illustrated in FIG. 3. FIG. 3 is a diagram illustrating an example of a data configuration of the table 1031. The table 1031 stores various kinds of information extracted from a radio wave transmitted by the wireless tag 600. The table 1031 includes commodity codes, position information, and phase information. The table 1031 stores a commodity code, position information, and phase information received from the wireless tag 600 in association with one another. The position information is information indicating a position of the antenna 300 at the time when the commodity code is received from the wireless tag 600. The phase information is information indicating a phase of a response wave received from the wireless tag 600.

The commodity list 1032 stores commodity codes concerning settlement target commodities. The RAM 103 that stores the commodity list 1032 is an example of a storing section that stores settlement target commodity codes.

The ROM 102 or the RAM 103 stores a threshold used in the processes explained below. A value of the threshold is decided by, for example, a designer, an administrator, or an operator of the reading device 100.

The first connection interface 104 is an interface for the reading device 100 to communicate with the driving device 200.

The second connection interface 105 is an interface for the reading device 100 to communicate with the POS terminal 400.

The high-frequency frontend section 106 outputs a signal to the antenna 300. A signal is input to the high-frequency frontend section 106 from the antenna 300.

The antenna 300 transmits and receives a radio wave between the antenna 300 and the wireless tag 600. The antenna 300 converts a received radio wave into an electric signal and outputs the electric signal to the reading device 100.

The digital amplitude modulating section 107 may be, for example, a circuit that adds information transmitted to the wireless tag 600 to a carrier wave transmitted to the wireless tag 600.

The DA conversion section 108 is a circuit that converts a digital signal into an analog signal. The DA conversion section 108 converts a digital signal converted by the digital amplitude modulating section 107 into an analog signal. The DA conversion section 108 outputs a high-frequency signal to the antenna 300 via the high-frequency frontend section 106.

The AD conversion section 109 is a circuit that converts an analog signal into a digital signal. The AD conversion section 109 converts a high-frequency signal input from the antenna 300 via the high-frequency frontend section 106 into a digital signal.

The demodulating section 110 may be, for example, a circuit that extracts various kinds of information from a radio wave received from the wireless tag 600. The demodulating section 110 extracts information such as a commodity code from the digital signal converted by the AD conversion section 109. The demodulating section 110 detects, with a quadrature detection method, a phase of the radio wave from the digital signal converted by the AD conversion section 109. Therefore, the demodulating section 110 is an example of a detecting section that detects a phase of a radio wave received by the antenna 300.

The bus 111 includes a control bus, an address bus, and a data bus and transmits signals exchanged by the sections of the reading device 100.

Figure 4:
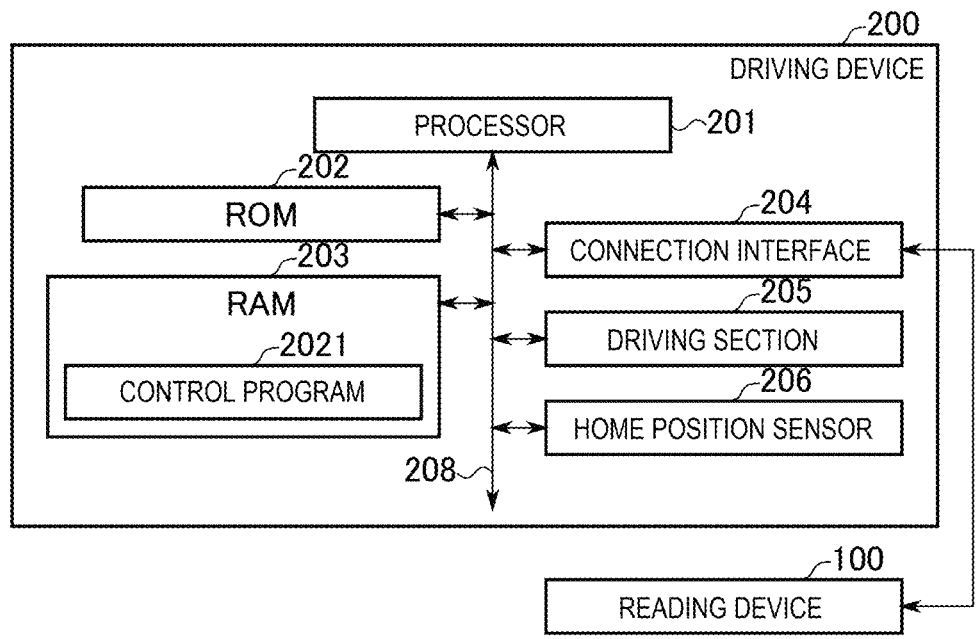
FIG. 4 is a block diagram illustrating a circuit configuration of a driving device of the checkout system illustrated in FIG. 1.
Figure 5:
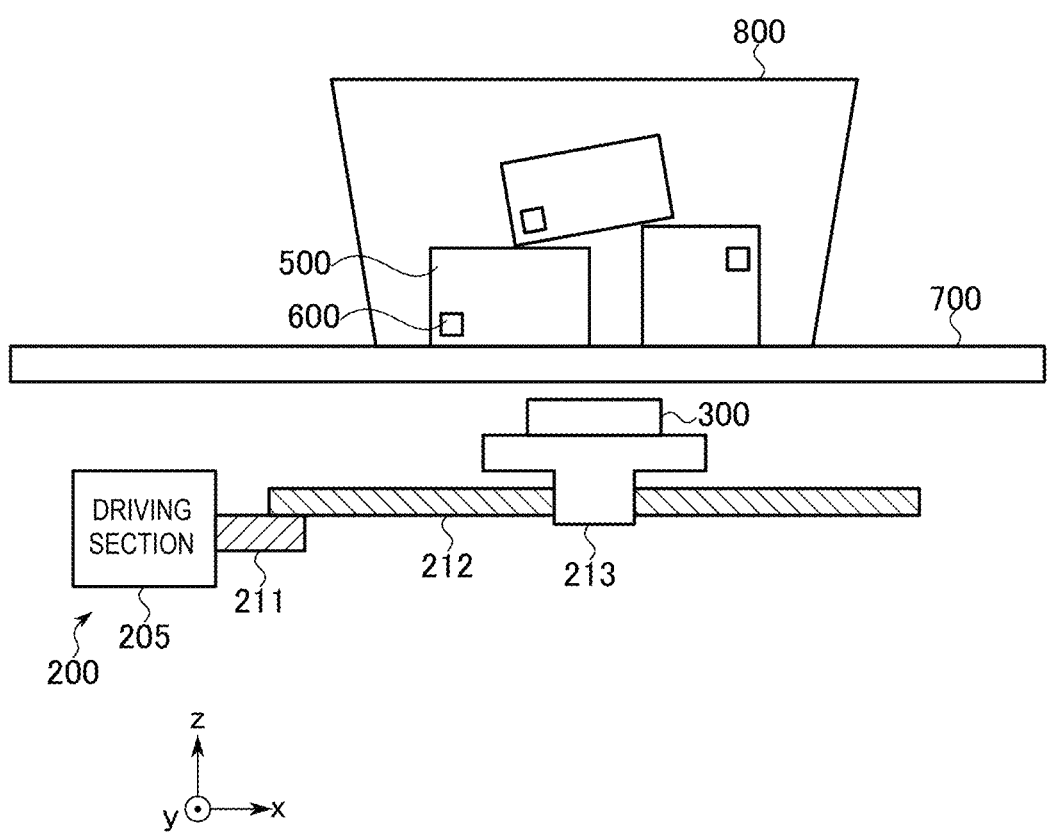
FIG. 5 is a schematic diagram of the driving device illustrated in FIG. 4.

The driving device 200 is explained with reference to FIGS. 4 and 5. FIG. 4 is a block diagram illustrating a circuit configuration of the driving device 200. FIG. 5 is a schematic diagram of the driving device 200.

The driving device 200 drives to move the antenna 300. As an example, the driving device 200 includes, as illustrated in FIG. 4, a processor 201, a ROM 202, a RAM 203, a connection interface 204, a driving section 205, and a home position sensor 206. These sections are connected by a bus 207 or the like. As an example, the driving device 200 includes, as illustrated in FIG. 5, a rotating shaft 211, a rail 212, and a moving stage 213.

The processor 201 is equivalent to a central part of a computer that performs processes such as an arithmetic operation and control necessary for the operation of the driving device 200. The processor 201 controls the sections in order to realize various functions of the driving device 200 based on computer programs such as system software, application software, or firmware stored in the ROM 202 or the like. The processor 201 may be, for example, a CPU, a MPU, a SoC, a DSP, a GPU, an ASIC, a PLD, or a FPGA. Alternatively, the processor 201 is a combination of a plurality of devices among these devices.

The ROM 202 is equivalent to a main storage device of the computer including the processor 201 as the central part. The ROM 202 is a nonvolatile memory exclusively used for readout of data. The ROM 202 stores the computer programs explained above. The ROM 202 stores data, various setting values, or the like used by the processor 201 in performing various kinds of processes.

The computer programs stored in the ROM 202 include a control program 2021 for executing processes explained below. As an example, the driving device 200 is transferred to an administrator or the like of the driving device 200 in a state in which the control program 2021 is stored in the ROM 202. However, the driving device 200 may be transferred to the administrator or the like in a state in which the control program 2021 is not stored in the ROM 202. The driving device 200 may be transferred to the administrator or the like in a state in which a computer program different from the control program 2021 is stored in the ROM 202. The control program 2021 may be separately transferred to the administrator or the like and written in the ROM 202 under operation by the administrator, a serviceperson, or the like. The transfer of the control program 2021 at this time can be realized by, for example, recording the control program 2021 in a removable recording medium such as a magnetic disk, a magneto-optical disk, an optical disk, or a semiconductor memory or downloading the control program 2021 via a network or the like.

The RAM 203 is equivalent to a main storage device of the computer including the processor 201 as the central part. The RAM 203 is a memory used for reading and writing of data. The RAM 203 is used as a so-called work area or the like in which data temporarily used by the processor 201 in performing the various kinds of processes is stored.

The connection interface 204 is an interface for connecting the driving device 200 to the reading device 100.

As illustrated in FIG. 5, the driving device 200 and the antenna 300 are disposed, for example, below a counter table 700. The counter table 700 is a table on which an article 500 attached with the wireless tag 600 is placed. The article 500 may be, for example, a commodity. The article 500 is placed on the counter table 700, for example, in a state in which the article 500 is put in a shopping basket 800.

The driving section 205 may be, for example, a stepping motor.

The rotating shaft 211 transmits a driving force to the driving section 205. Screw grooves are formed on the rotating shaft 211 and the rail 212. The screw grooves are opposed and coupled. Therefore, if the driving section 205 performs rotation driving, the rotating shaft 211 rotates and the rail 212 moves. The moving stage 213, on which the antenna 300 is placed, is attached to the rail 212.

The moving stage 213 includes a ball screw nut. If the rail 212 is rotated by the ball screw nut, the moving stage 213 moves in the horizontal direction. That is, the moving stage 213 moves in an x-axis direction illustrated in FIG. 5. The moving stage 213 moves in the opposite direction if a rotating direction of the rail 212 is reversed. In this way, the driving device 200 causes the antenna 300 to reciprocate in the x-axis direction along the rail 212.

The home position sensor 206 is a sensor that detects whether the moving state 213 is present in a predetermined position called home position.

The bus 207 includes a control bus, an address bus, and a data bus and transmits signals exchanged by the sections of the driving device 200.

Figure 6:
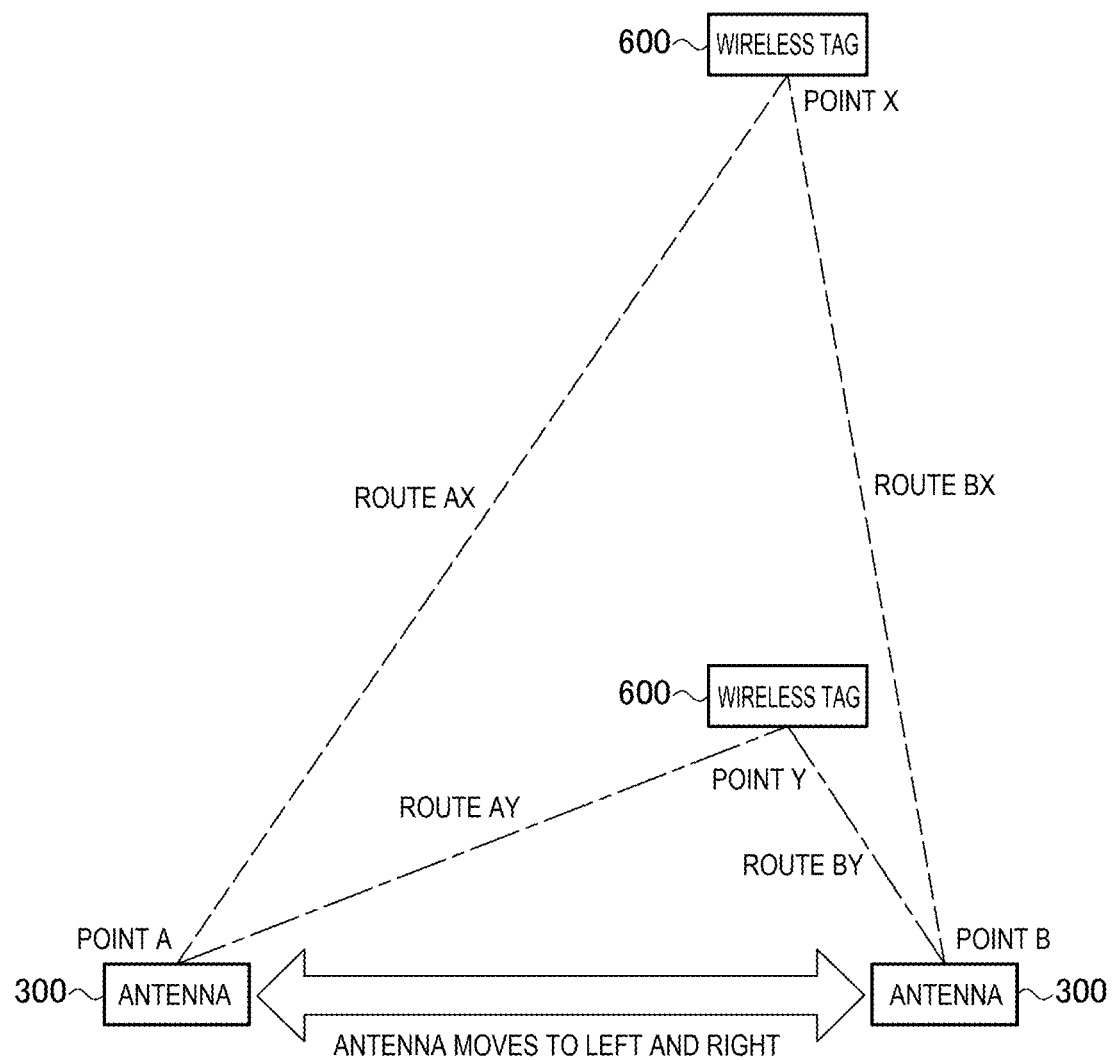
FIG. 6 is a diagram illustrating a phase change due to movement of an antenna, according to an example embodiment.

FIG. 6 is a diagram illustrating a phase change due to movement of the antenna 300. If the driving device 200 moves the antenna 300, a change in the distance from the antenna 300 to the wireless tag 600 is larger as the distance from the antenna 300 to the wireless tag 600 is shorter. For example, in FIG. 6, an amount of change (BY-AY) between a distance AY from a point A to a point Y and a distance BY from a point B to the point Y is larger than an amount of change (BX-AX) between a distance AX from the point A to a point X and a distance BX from the point B to the point X. That is, a phase difference of a radio wave received from the wireless tag 600 is also larger as the distance from the antenna 300 to the wireless tag 600 is shorter.

If the antenna 300 receives a commodity code from the wireless tag 600, the reading device 100 stores the commodity code, a phase of a wireless tag response wave, and a receiving position of the antenna 300 at the time of the reception of the commodity code in association with one another. The reading device 100 compares phases associated with the same commodity code received in different receiving positions.

If an amount of change in the phases per displacement distance due to displacement of the receiving positions is equal to or larger than a threshold, the reading device 100 determines that the wireless tag 600, which transmits the commodity code, is present on the inner side of a predetermined region. On the other hand, if the amount of change in the phases per displacement distance is smaller than the threshold, the reading device 100 determines that the wireless tag 600, which transmits the commodity code, is present on the outer side of the predetermined region.

Figure 7:
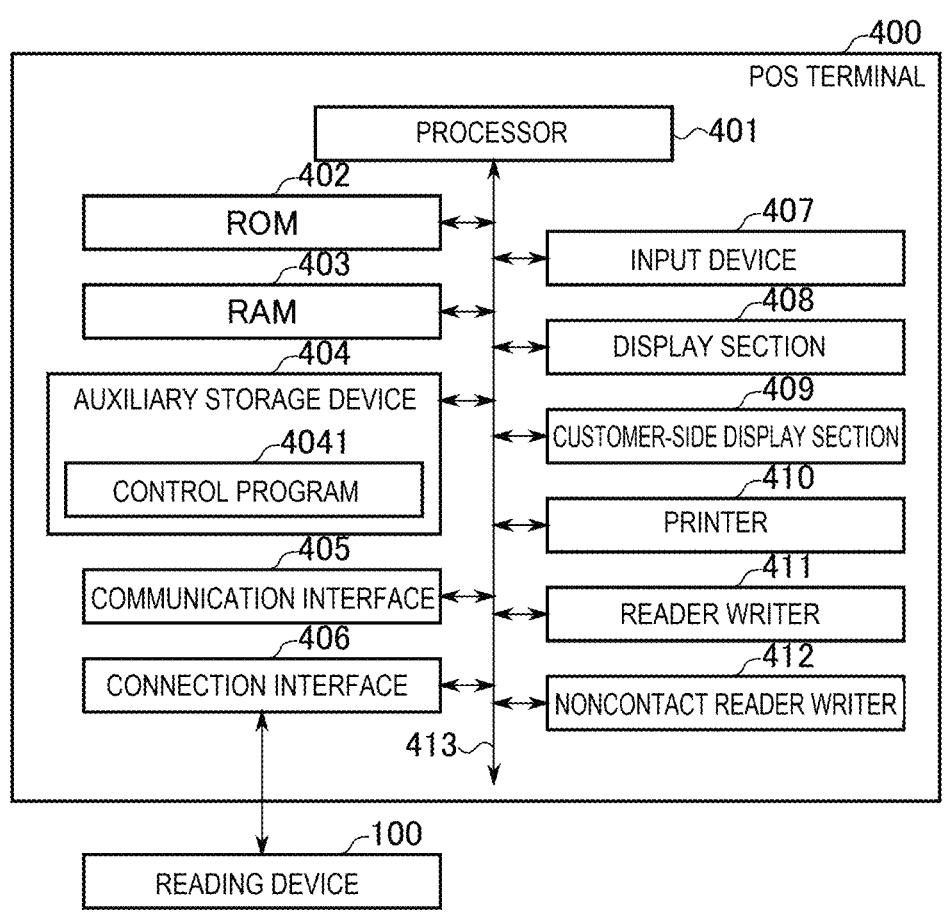
FIG. 7 is a block diagram illustrating a circuit configuration of a POS terminal illustrated of the checkout system illustrated in FIG. 1.

The POS terminal 400 is explained with reference to FIG. 7. FIG. 7 is a block diagram illustrating a circuit configuration of the POS terminal 400.

The POS terminal 400 is set in a store such as a retail store for register jobs such as registration of settlement target commodities and settlement of the registered commodities. The POS terminal 400 may be a terminal included in a POS system. However, the POS terminal 400 may be an electronic cash register not included in the POS system. The POS terminal 400 may be, for example, a self-type terminal operated by a shopper or the like in the store. Alternatively, the POS terminal 400 may be a semi-self-type terminal including a registering device that performs registration of commodities and a settling device that performs settlement concerning the registered commodities. In a typical operation of the semi-self-type POS terminal 400, a store clerk operates the registering device and a shopper operates the settling device. Alternatively, the POS terminal 400 may be a terminal operated by the store clerk or the like of the store. As an example, the POS terminal 400 includes a processor 401, a ROM 402, a RAM 403, an auxiliary storage device 404, a communication interface 405, a connection interface 406, an input device 407, a display section 408, a customer-side display section 409, a printer 410, a reader writer 411, and a noncontact reader writer 412. These sections are connected by a bus 413 or the like.

The processor 401 is equivalent to a central part of a computer that performs processes such as an arithmetic operation and control necessary for the operation of the POS terminal 400. The processor 401 controls the sections in order to realize various functions of the POS terminal 400 based on computer programs such as system software, application software, or firmware stored in the ROM 402, the auxiliary storage device 404, or the like. The processor 401 may be, for example, a CPU, a MPU, a SoC, a DSP, a GPU, an ASIC, a PLD, or an FPGA. Alternatively, the processor 401 is a combination of a plurality of devices among these devices.

The ROM 402 is equivalent to a main storage device of the computer including the processor 401 as the central part. The ROM 402 is a nonvolatile memory exclusively used for readout of data. The ROM 402 stores the computer programs explained above. The ROM 402 stores data, various setting values, or the like used by the processor 401 in performing various kinds of processes.

The RAM 403 is equivalent to a main storage device of the computer including the processor 401 as the central part. The RAM 403 is a memory used for reading and writing of data. The RAM 403 is used as a so-called work area in which data temporarily used by the processor 401 in performing the various kinds of processes is stored.

The auxiliary storage device 404 is equivalent to an auxiliary storage device of the computer including the processor 401 as the central part. The auxiliary storage device 404 may be, for example, an electric erasable programmable read-only memory (EEPROM), a hard disk drive (HDD), or a solid state drive (SSD). The auxiliary storage device 404 sometimes stores the computer programs explained above. The auxiliary storage device 404 stores data used by the processor 401 in performing the various kinds of processes and data, various setting values, or the like generated by the processes in the processor 401.

The computer programs stored in the auxiliary storage device 404 include a control program 4041 for executing processes explained below. As an example, the POS terminal 400 is transferred to an administrator or the like of the POS terminal 400 in a state in which the control program 4041 is stored in the auxiliary storage device 404. However, the POS terminal 400 may be transferred to the administrator or the like in a state in which the control program 4041 is not stored in the auxiliary storage device 404. The POS terminal 400 may be transferred to the administrator or the like in a state in which a computer program different from the control program 4041 is stored in the auxiliary storage device 404. The control program 4041 may be separately transferred to the administrator or the like and written in the auxiliary storage device 404 under operation by the administrator, a serviceperson, or the like. The transfer of the control program 4041 can be realized by, for example, recoding the control program 4041 in a removable storage medium such as a magnetic disk, a magneto-optical disk, an optical disk, or a semiconductor memory or downloading the control program 4041 via a network or the like.

The control program 4041 may be stored in the ROM 402.

The auxiliary storage device 404 stores a commodity database. The commodity database is a database including various kinds of information such as commodity codes, commodity names, and amounts concerning commodities sold in the store. Alternatively, the POS terminal 400 may refer to, every time, the commodity database stored in the server or the like.

The communication interface 405 is an interface for the POS terminal 400 to communicate via a network or the like.

The connection interface 406 is an interface for the POS terminal 400 to communicate with the reading device 100.

The input device 407 receives operation by an operator of the POS terminal 400. The input device 407 may be, for example, a keyboard, a keypad, or a touch pad.

The display section 408 displays a screen for notifying various kinds of information to the operator of the POS terminal 400. The display section 408 is a display such as a liquid crystal display or an organic electro-luminescence (EL) display. A touch panel can be used as the input device 407 and the display section 408. That is, a display panel included in the touch panel can be used as the display section 408. A touch pad included in the touch panel can be used as the input device 407.

The customer-side display section 409 displays a screen for notifying (e.g., providing, displaying, etc.) various kinds of information to the shopper. The customer-side display section 409 is a display such as a liquid crystal display or an organic EL display. A touch panel can be used as the customer-side display section 409. In this case, the customer-side display section 409 also operates as an input device that receives operation by the shopper.

The printer 410 prints a receipt or the like. The printer 410 is any one of printers of various types such as a dot-impact printer, an inkjet printer, a thermal printer, a laser printer, and other printers.

The reader writer 411 performs communication with a magnetic card (e.g., a magnetic stripe card, etc.), a contact integrated circuit (IC) card, or the like.

The noncontact reader writer 412 performs communication with a noncontact IC card or the like. The noncontact reader writer 412 performs communication with a noncontact IC chip mounted on an electronic device (e.g., a cellular phone, a smartphone, a tablet personal computer (PC), etc.).

The bus 413 includes a control bus, an address bus, and a data bus and transmits signals exchanged by the sections of the POS terminal 400.

The wireless tag 600 is attached to the article 500. The wireless tag 600 may be an RFID tag. The wireless tag 600 may be other wireless tags such as an IC tag. The wireless tag 600 may be, for example, a passive wireless tag that operates using, as an energy source, a predetermined radio wave transmitted from the antenna 300. The wireless tag 600 transmits a signal including a commodity code by, for example, performing backscatter modulation on a non-modulation signal.

Figure 8:
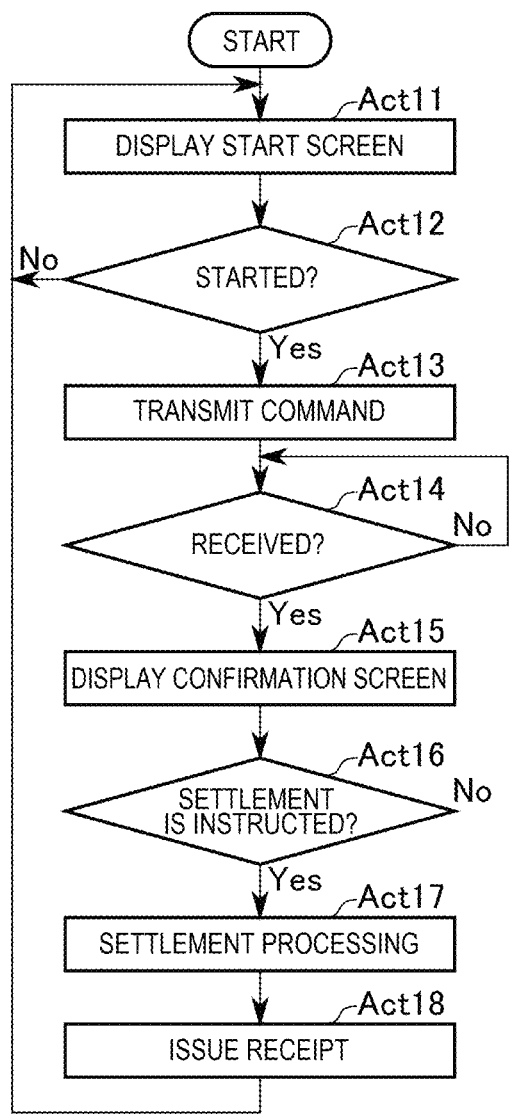
FIG. 8 is a flowchart of a process implemented by a processor of the POS terminal illustrated in FIG. 7.
Figure 9:
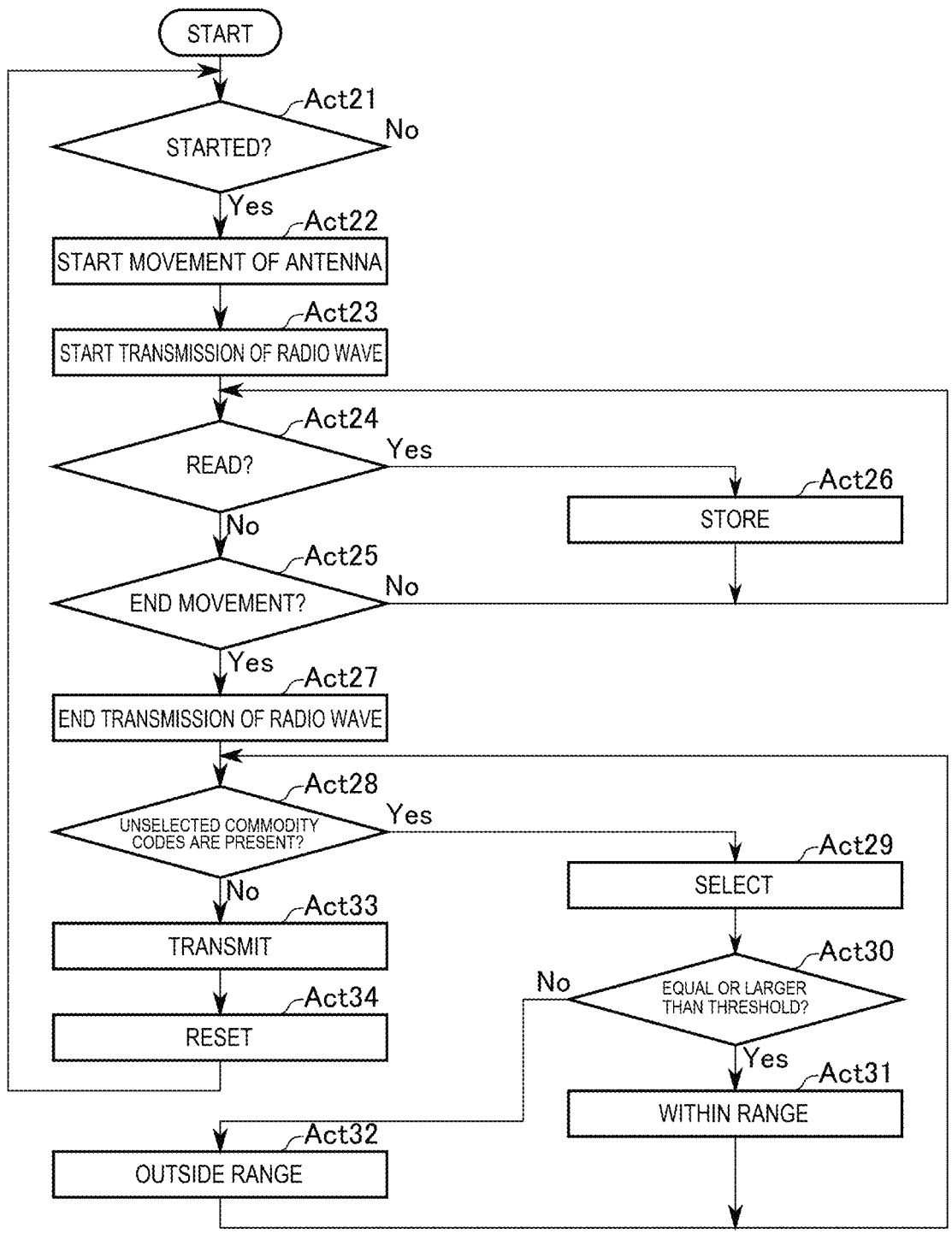
FIG. 9 is a flowchart of a process implemented by a processor of the reading device illustrated in FIG. 2.
Figure 10:
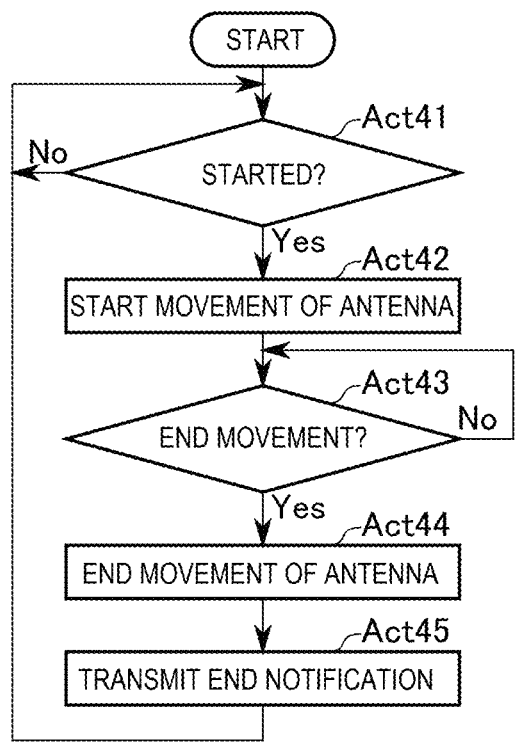
FIG. 10 is a flowchart of a process implemented by a processor of the driving device illustrated in FIG. 4.

The operation of the checkout system 1 according to the embodiment is explained below with reference to FIGS. 8 to 10 and the like. Content of processes in the following operation example is an example. Various kinds of processes capable of obtaining the same result can be used as appropriate. FIG. 8 is a flowchart of a process implemented by the processor 401 of the POS terminal 400. The processor 401 executes the process based on the computer programs stored in the ROM 402, the auxiliary storage device 404, or the like. FIG. 9 is a flowchart of a process implemented by the processor 101 of the reading device 100. The processor 101 executes the process based on the computer programs stored in the ROM 102 or the like. FIG. 10 is a flowchart of a process implemented by the processor 201 of the driving device 200. The processor 201 executes the process based on the computer programs stored in the ROM 202 or the like. If the processor 101, the processor 201, or the processor 401 proceeds to Act (N+1) after a process in Act N (N is a natural number), description for explaining this is sometimes omitted.

The processor 401 of the POS terminal 400 starts the process illustrated in FIG. 8 in response to, for example, a start of the POS terminal 400.

In Act 11 in FIG. 8, the processor 401 generates an image corresponding to a start screen. The processor 401 instructs the display section 408 to display the generated image. In response to the instruction, the display section 408 displays the start screen.

As an example, the start screen includes a start button. The start button is a button that the operator operates if the operator instructs a start of commodity registration.

For example, the operator of the POS terminal 400 places the article 500, which the operator desires to set as a settlement target, on the counter table 700. The operator performs operation for instructing the start of the commodity registration such as operation of the start button.

In Act 12, the processor 401 waits for operation for instructing the start of the commodity registration to be performed. That is, the processor 401 waits for predetermined operation for operating an operation button to be performed. If the operation for instructing the start of the commodity registration is performed, the processor 401 determines Yes in Act 12 and proceeds to Act 13.

In Act 13, the processor 401 instructs the connection interface 406 to transmit a scan start command to the reading device 100. In response to the instruction, the connection interface 406 transmits the scan start command to the reading device 100. The transmitted scan start command is received by the second connection interface 105 of the reading device 100. The scan start command is a command for instructing the reading device 100 to read a commodity code from the wireless tag 600.

On the other hand, in Act 21 in FIG. 9, the processor 101 of the reading device 100 waits for the scan start command to be received by the second connection interface 105. If the scan start command is received, the processor 101 determines Yes in Act 21 and proceeds to Act 22.

In Act 22, the processor 101 instructs the second connection interface 105 to transmit a driving start command to the driving device 200. In response to the instruction, the second connection interface 105 transmits the driving start command to the driving device 200. The transmitted driving start command is received by the connection interface 204 of the driving device 200. The driving start command is a command for instructing the driving device 200 to start driving and start movement of the antenna 300.

On the other hand, in Act 41 in FIG. 10, the processor 201 of the driving device 200 waits for the driving start command to be received by the connection interface 204. If the driving start command is received, the processor 201 determines Yes in Act 41 and proceeds to Act 42.

In Act 42, the processor 201 controls the driving section 205 to start reciprocation of the antenna 300. The driving section 205 starts driving according to the control. Consequently, the reciprocation of the antenna 300 is started.

On the other hand, in Act 23 in FIG. 9, the processor 101 of the reading device 100 controls the sections and starts transmission of a predetermined radio wave for reading information from the wireless tag 600. The radio wave is transmitted from the antenna 300.

In Act 24, the processor 101 determines whether a commodity code is read. If determining that a commodity code is not read, the processor 101 determines No in Act 24 and proceeds to Act 25.

In Act 25, the processor 101 determines whether an end notification is received by the first connection interface 104. If the end notification is not received, the processor 101 determines No in Act 25 and returns to Act 24. In this way, the processor 101 repeats Act 24 and Act 25 until the processor 101 determines that a commodity code is read or until the end notification is received.

The antenna 300 receives a response wave transmitted from the wireless tag 600. The response wave is demodulated by the demodulating section 110. If a commodity code is included in the demodulated response wave, the processor 101 determines that a commodity code is read.

If determining that a commodity code is read in waiting states in Act 24 and Act 25, the processor 101 determines Yes in Act 24 and proceeds to Act 26.

In Act 26, the processor 101 stores the input commodity code in the table 1031 in association with position information and phase information. That may be, for example, the processor 101 adds a record including the commodity code, the position information, and the phase information to the table 1031. The position information indicates, for example, a position of the antenna 300 at the time when the response wave including the commodity code is received. The phase information indicates a phase of the response wave. The processor 101 returns to Act 24 after the process in Act 26.

On the other hand, in Act 43 in FIG. 10, the processor 201 of the driving device 200 waits for the reciprocation of the antenna 300 to end. If the reciprocation of the antenna 300 ends, the processor 201 determines Yes in Act 43 and proceeds to Act 44.

In Act 44, the processor 201 instructs the connection interface 204 to transmit an end notification to the reading device 100. In response to the instruction, the connection interface 204 transmits the end notification to the reading device 100. The transmitted end notification is received by the first connection interface 104 of the reading device 100. The end notification notifies that the reciprocation of the antenna 300 ends. After the process in Act 44, the processor 201 returns to Act 41.

On the other hand, if the end notification is received in the waiting states in Act 24 and Act 25 in FIG. 9, the processor 101 determines Yes in Act 25 and proceeds to Act 27.

In Act 27, the processor 101 ends the transmission of the predetermined radio wave, the transmission of which is started in Act 23.

In Act 28, the processor 101 determines whether unselected commodity codes are present among the commodity codes included in the table 1031. If unselected commodity codes are present, the processor 101 determines Yes in Act 28 and proceeds to Act 29.

In Act 29, the processor 101 selects one of the unselected commodity codes among the commodity codes included in the table 1032. The selected commodity code is hereinafter referred to as "commodity code under selection". There is only one commodity code under selection. If the processor 101 executes the process in Act 29 a plurality of times, a commodity code selected last is the commodity code under selection.

In Act 30, the processor 101 determines whether the commodity code under selection is read from the wireless tag 600 present within a reading range. That is, the processor 101 determines whether a phase change amount is equal to or larger than the threshold in all set areas. The phase change amount and the area are explained below with reference to FIGS. 11 and 12.

The reading device 100 sets a plurality of areas with respect to the position information. As an example, the reading device 100 sets a range of x=0 to 100 millimeters (mm) as an area AR11 and sets a range of x=100 to 200 mm as an area AR12. In this case, there are two set areas. For example, the designer, the administrator, or the like of the reading device 100 decides how areas are set.

The processor 101 calculates a phase change amount concerning each of the set areas. As an example, a method of calculating a phase change amount concerning the area AR11 is explained. The processor 101 extracts, referring to the table 1031, a maximum and a minimum of values of a phase information field out of records that satisfy conditions (1) and (2) described below.

(1) A value of a commodity code field is the commodity code under selection.

(2) A value of a position information field is within a range of the area AR11. That is, the value of the position information field is in a range of 0 to 100.

The processor 101 calculates a difference between the maximum and the minimum. The difference is a phase change amount. The processor 101 calculates phase change amounts concerning the respective areas in the same manner.

Figure 11:
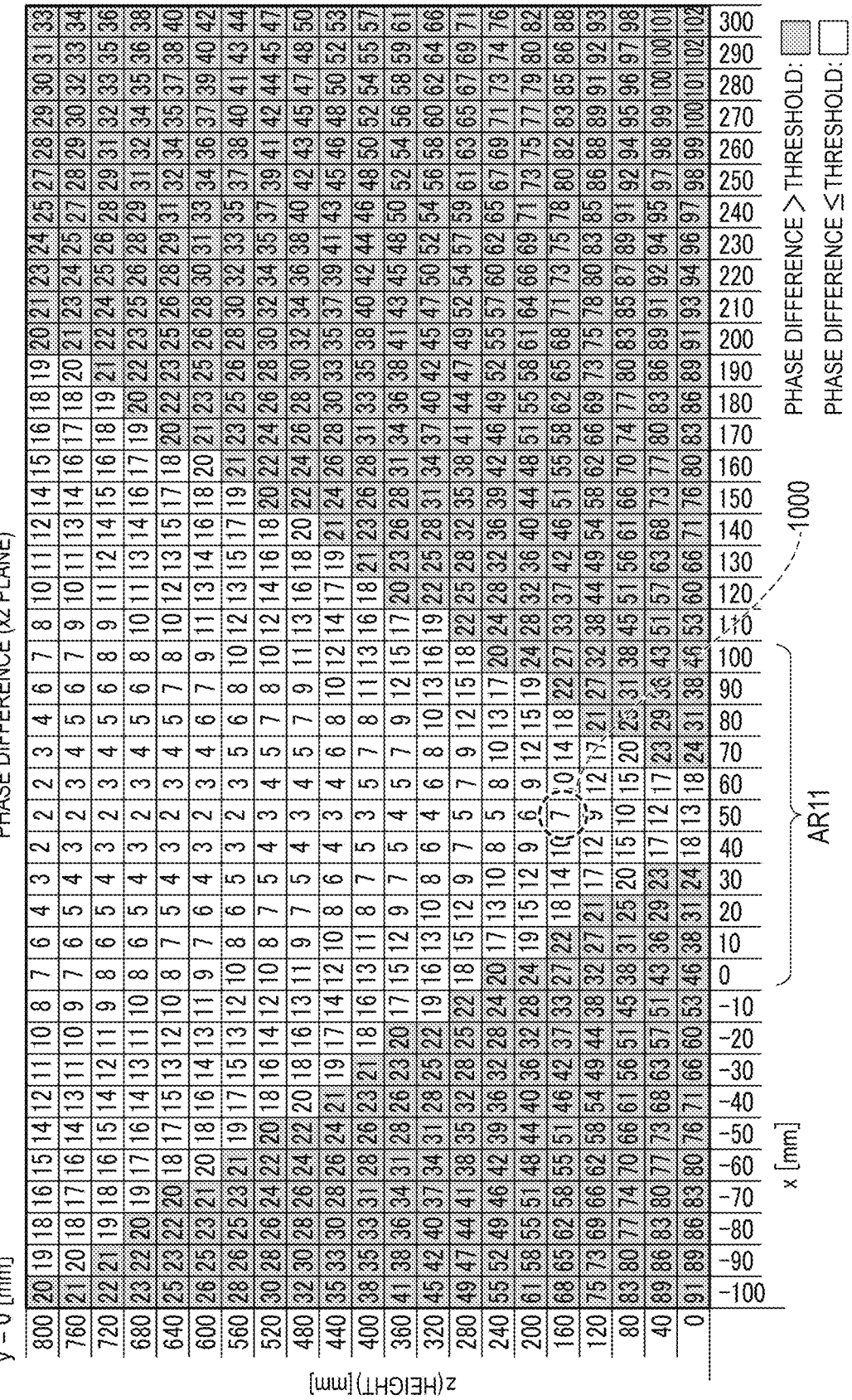
FIG. 11 is a diagram illustrating phase change amounts in positions on an xz plane, according to an example embodiment.
Figure 12:
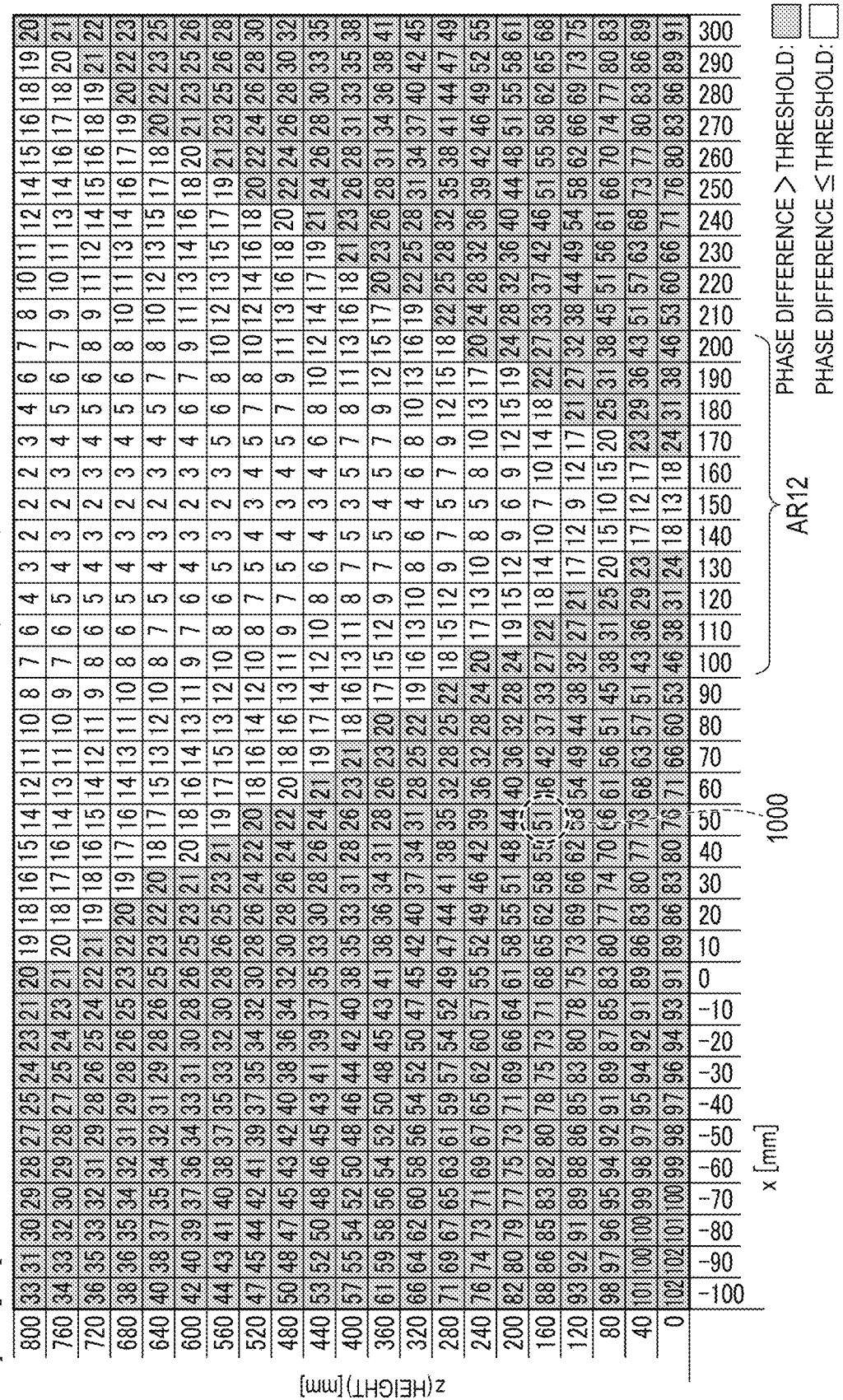
FIG. 12 is another diagram illustrating phase change amounts in positions on the xz plane, according to an example embodiment.

In FIGS. 11 and 12, theoretical values of phase change amounts of positions on an xz plane where the wireless tag 600 is present are illustrated. Note that a y coordinate of a position of the wireless tag 600 illustrated in FIGS. 11 and 12 is set to 0. FIG. 11 illustrates a phase change amount concerning the area AR11. FIG. 12 illustrates a phase change amount concerning the area AR12.

In the wireless tag 600 present in a distance (e.g., z>320 mm), the phase change amounts are small in both of the area AR11 and the area AR12 as illustrated in FIGS. 11 and 12. On the other hand, if focusing on a near position 1000, the phase change amount in the area AR11 is small (e.g., smaller than the threshold) but the phase change amount in the area AR12 is large (e.g., equal to the threshold, larger than the threshold).

If both the calculated phase change amounts are equal to or larger than the threshold, that is, if the phase change amounts concerning all the set areas are equal to or larger than the threshold, the processor 101 determines Yes in Act 30 and proceeds to Act 31.

On the other hand, if the phase change amount concerning one of the areas is smaller than the threshold, the processor 101 determines No in Act 30 and proceeds to Act 32. If there is an area where the number of fields satisfying the conditions (1) and (2) is not plural, the processor 101 determines No in Act 30 and proceeds to Act 32. That is, if there is an area where the number of fields satisfying the conditions (1) and (2) is one or less, the processor 101 determines No in Act 30 and proceeds to Act 32. This is because such a wireless tag 600 is highly likely to be present in a far distance.

Figure 13:
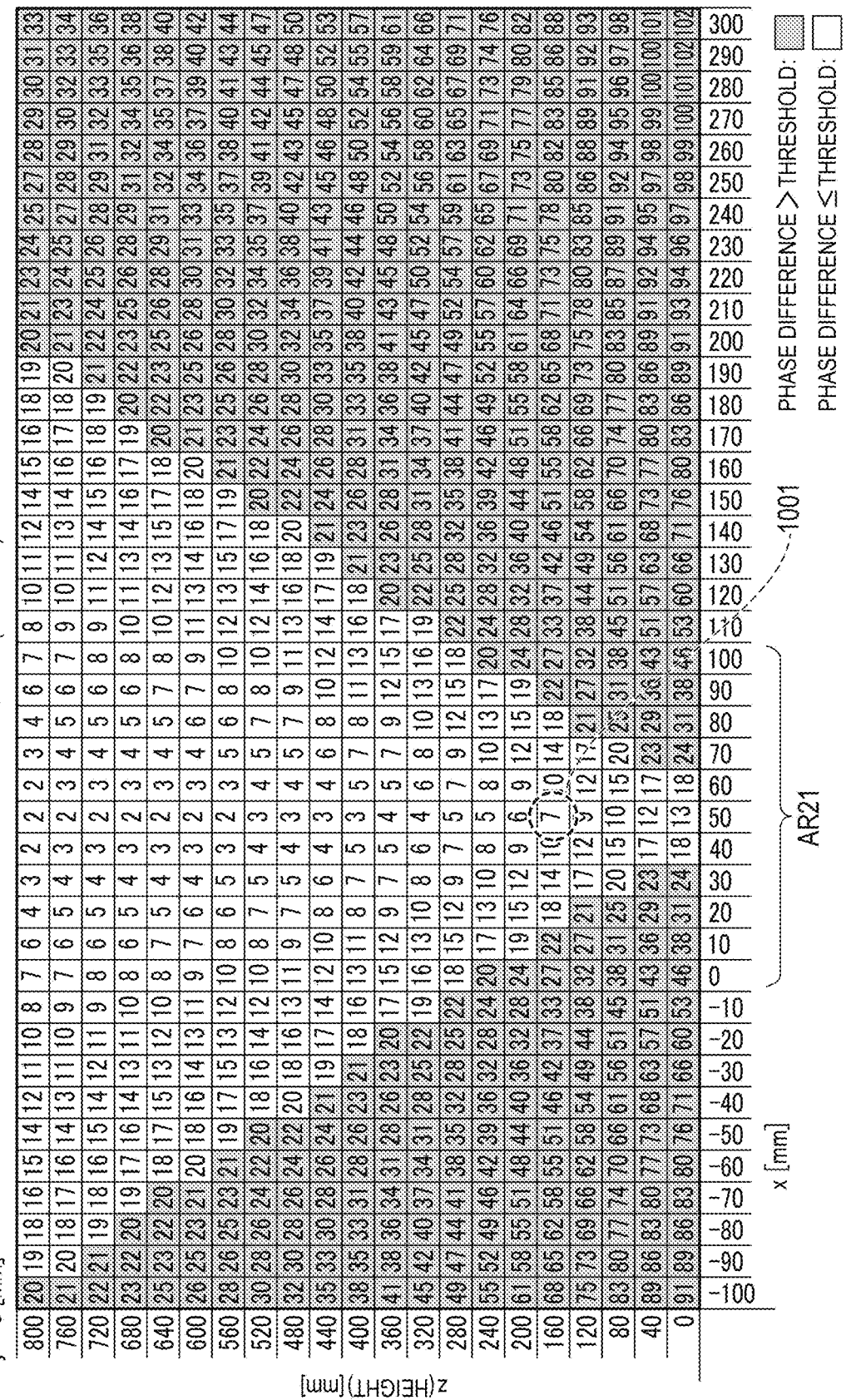
FIG. 13 is yet another diagram illustrating phase change amounts in positions on the xz plane, according to an example embodiment.
Figure 14:
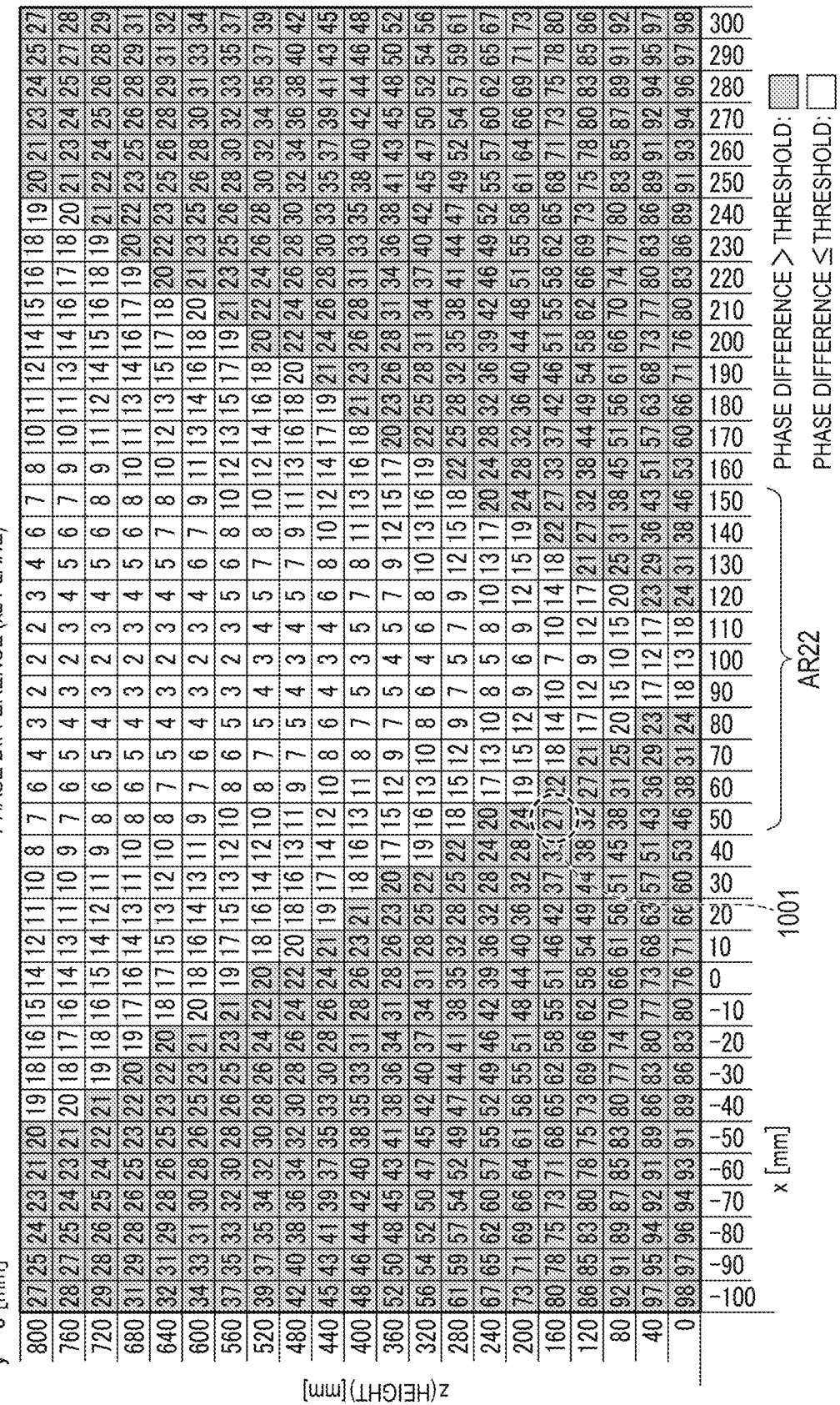
FIG. 14 is yet another diagram illustrating phase change amounts in positions on the xz plane, according to an example embodiment.
Figure 15:
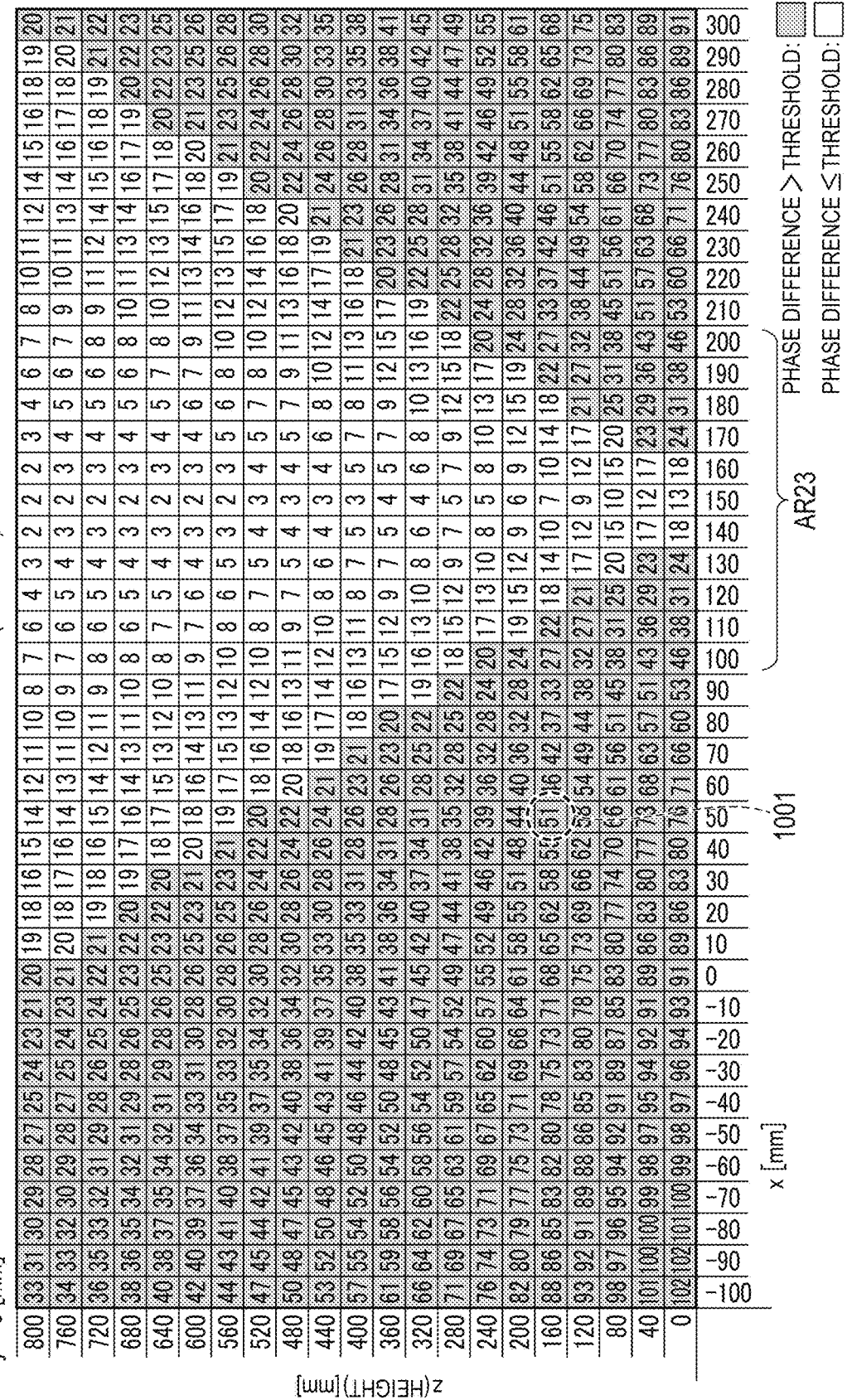
FIG. 15 is yet another diagram illustrating phase change amounts in positions on the xz plane, according to an example embodiment.

In the above explanation, the set areas are the two areas AR11 and AR12. However, the number of set areas may be three or more. For example, three areas AR21 to AR23 are set as illustrated in FIGS. 13 to 15.

As an example, the processor 101 sets a range of x=0 to 100 mm as an area AR21, sets a range of x=50 to 150 mm as an area AR22, and sets a range of x=100 to 200 mm as an area AR23. In this case, in the wireless tag 600 present in a distance (e.g., z>320 mm), as illustrated in FIGS. 13 to 15, phase change amounts are small in all the area AR21 to the area AR23. On the other hand, if focusing on a near position 1001, phase change amounts in the area AR21 and the area AR22 are small (e.g., smaller than the threshold) but a phase change amount in the area AR23 is large (e.g., equal to the threshold, larger than the threshold).

According to the above explanation, the processor 101 is an example of a determining section that determines that the wireless tag 600 is present outside a predetermined range.

The area AR11 and the area AR12 are examples of a first range and a second range. The area AR21 to the area AR23 are examples of a first range to a third range. Positions indicated by position information fields of records in which values of phase information fields in the areas indicate a maximum and positions indicated by position information fields of records in which the values of the phase information fields in the areas indicate a minimum are respectively examples of a first position to a sixth position.

In Act 31, the processor 101 determines that the commodity code under selection is read from the wireless tag 600 present within the reading range. The processor 101 registers the commodity code under selection in a commodity list. The processor 101 makes it seen that the commodity code is already selected. For example, the processor 101 adds the commodity code to a selected commodity code list. The selected commodity code list is a list that stores selected commodity codes. After the process in Act 31, the processor 101 returns to Act 28.

On the other hand, if a plurality of records including the same commodity code are absent, the processor 101 determines No in Act 30 and proceeds to Act 32. If the phase change amount is smaller than the threshold in any one of the areas, the processor 101 determines No in Act 30 and proceeds to Act 32.

In Act 32, the processor 101 determines that the commodity code under selection is read from the wireless tag 600 present outside the reading range. The processor 101 makes it seen that the commodity code is already selected. For example, the processor 101 adds the commodity code to the selected commodity code list. After the process in Act 32, the processor 101 returns to Act 28.

As explained above, the processor 101 repeats the process in Acts 28 to 32 to determine whether the commodity codes included in the table 1031 are present within the reading range.

If unselected commodity codes are absent, the processor 101 determines No in Act 28 and proceeds to Act 33.

In Act 33, the processor 101 instructs the second connection interface 105 to transmit the commodity list to the POS terminal 400. In response to the instruction, the second connection interface 105 transmits the commodity list to the POS terminal 400. The transmitted commodity list is received by the communication interface 405 of the POS terminal 400.

In Act 34, the processor 101 resets the commodity list, the table 1031, and the selected commodity code list. That is, the processor 101 resets the commodity list to a state in which no commodity is registered in the commodity list. For example, the processor 101 deletes all records of the table 1031. Further, the processor 101 resets the selected commodity code list to a state in which no selected commodity code is registered in the selected commodity code list. After the process in Act 34, the processor 101 returns to Act 21.

On the other hand, in Act 14 in FIG. 8, the processor 401 of the POS terminal 400 waits for the commodity list to be received by the communication interface 405. If the commodity list is received, the processor 401 determines Yes in Act 14 and proceeds to Act 15.

In Act 15, the processor 401 generates an image corresponding to a confirmation screen. The processor 401 instructs the display section 408 to display the generated image. In response to the instruction, the display section 408 displays the confirmation screen.

The confirmation screen includes a list of commodities registered in the commodity list, amounts of the commodities, a total amount of the commodities, and a settlement button. The settlement button is a button that the operator operates if the operator instructs the POS terminal 400 to perform settlement concerning the commodities registered in the commodity list.

In Act 16, the processor 401 waits for operation for instructing the POS terminal 400 to perform settlement to be performed. That is, the processor 401 waits for predetermined operation such as operation of the settlement button to be performed. If the operation for instructing the POS terminal 400 to perform settlement is performed, the processor 401 determines Yes in Act 16 and proceeds to Act 17. On the other hand, if the operation for instructing the POS terminal 400 to perform settlement is not performed, the processor 401 determines No in Act 16 and proceeds to Act 18.

In Act 17, the processor 401 performs a settlement process based on a commodity code registered in the commodity list. The processor 401 acquires an amount, a commodity name, and the like of a commodity indicated by the commodity code from the commodity database. The processor 401 performs, in the settlement process, settlement using, for example, cash, a credit card, a debit card, a coupon, a gift certificate, an electronic money, or QR settlement. [0088] In Act 18, the processor 401 controls the printer 410 to issue a receipt or the like based on a result of the settlement process. The printer 410 issues the receipt or the like based on the control. After the process in Act 18, the processor 401 returns to Act 11.

According to various embodiments, the reading device 100 sets two or more areas with respect to the position information. The reading device 100 determines, concerning a commodity code read from each wireless tag 600, whether phase change amounts concerning the respective areas are equal to or larger than the threshold. If the phase change amount concerning any one of the areas is smaller than the threshold, the reading device 100 determines that the wireless tag 600 is present outside the reading range.

By performing the determination dividedly for the two or more areas as explained above, the reading device 100 can more highly accurately determine whether the wireless tag 600 is present within the reading range than in the past. Consequently, the reading device 100 can prevent the reading device 100 from erroneously reading information from wireless tags in the periphery.

According to various embodiments, the reading device 100 stores, as a settlement target commodity code, a commodity code read from the wireless tag 600 determined as being present within the reading range. The reading device 100 transmits the settlement target commodity code to the POS terminal 400. Consequently, the POS terminal 400 can perform settlement based on the received settlement target commodity code.

According to various embodiments, the reading device 100 sets three or more areas. Consequently, the reading device 100 can more highly accurately determine whether the wireless tag 600 is present within the reading range.

In various embodiments, the reading device 100 determines that a target wireless tag 600 is present outside the reading range if a radio wave transmitted from the target wireless tag 600 is not received in the areas a plurality of times. With such determination, the reading device 100 can determine that the wireless tag 600 is present outside the reading range.

Modifications of the embodiment explained above are also possible as explained below.

In various embodiments, the antenna 300 performs reception and transmission. However, an antenna for reception and an antenna for transmission may be separately connected to the reading device 100.

In various embodiments, the antenna 300 is moved. In some embodiments, the article 500 attached with the wireless tag 600 is moved. A relative position of the antenna 300 with respect to the wireless tag 600 changes irrespective of whether the antenna 300 is moved or the article 500 is moved. In some embodiments, both the antenna 300 and the article 500 are moved.

A plurality of antennas may be connected to the reading device 100. The reading device 100 may receive, in each of the plurality of antennas, a radio wave transmitted from the wireless tag 600. In various embodiments, the reading device 100 moves the antenna 300 to receive the radio wave transmitted from the wireless tag 600 in a plurality of positions. The reading device 100 can receive the radio wave transmitted from the wireless tag 600 in the plurality of positions using antennas provided in the plurality of positions instead of moving the antenna 300. In this case, since the movement of the antenna 300 is unnecessary, the checkout apparatus 10 is may be excellent in quietness (e.g., may produce minimal noise, etc.). Since a time required for the movement of the antenna 300 is also unnecessary, the checkout apparatus 10 is capable of performing high-speed operation.

In various embodiments, the reading device 100 moves the antenna 300 once and stores a phase in Act 26. The reading device 100 calculates a phase change amount in each of the set areas. In this way, the reading device 100 virtually moves the antenna 300 in a plurality of areas. However, the reading device 100 may move the antenna 300 in each of ranges corresponding to the set areas and perform measurement.

In various embodiments, the reading device 100 is used in the checkout system 1. However, the reading device 100 may also be used in other various systems. In the other various systems as well, the reading device 100 is capable of collectively reading information from a plurality of wireless tags 600 within the reading range.

While certain embodiments have been described, these embodiments have been presented by way of example only, and are not intended to limit the scope of the present application. Indeed, the novel embodiments described herein may be embodied in a variety of other forms; furthermore, various omissions, substitutions and changes in the form of the embodiments described herein may be made without departing from the spirit of the present application. The accompanying claims and their equivalents are intended to cover such forms or modifications as would fall within the scope and spirit of the present application.

What is claimed is:

1. A communication apparatus comprising:
an antenna configured to receive a radio wave comprising a commodity code, the radio wave being transmitted from a wireless tag as the antenna moves along a plane parallel to the wireless tag;
a detecting section configured to detect a phase of the radio wave received by the antenna;
a determining section configured to:
determine, based on the radio wave, if a relative position of the antenna with respect to the wireless tag is a first position within a first range;
measure a first phase while the relative position of the antenna with respect to the wireless tag is the first position;
determine, based on the radio wave, if the relative position of the antenna with respect to the wireless tag is a second position within the first range;
measure a second phase while the relative position of the antenna with respect to the wireless tag is the second position;
determine a first phase difference between the first phase and the second phase;
determine if the first phase difference is smaller than a threshold;
determine, based on the radio wave, if the relative position of the antenna with respect to the wireless tag is a third position within a second range different from the first range;
measure a third phase while the relative position of the antenna with respect to the wireless tag is the third position;
determine if the relative position of the antenna with respect to the wireless tag is a fourth position within the second range;
measure a fourth phase while the relative position of the antenna with respect to the wireless tag is the fourth position;
determine a second phase difference between the third phase and the fourth phase;
determine if the second phase difference is smaller than the threshold;
index a counter for each determination that the first phase difference is smaller than the threshold and each determination that the second phase difference is smaller than the threshold; and
determine that the wireless tag is present within a predetermined range while the counter is greater than a counter threshold, the predetermined range being a range for settlement of the wireless tag at a point of sale (POS) terminal; and
a storing section configured to store the commodity code as a settlement target commodity code while the wireless tag is present within the predetermined range;
wherein the communication apparatus is configured to provide the settlement target commodity code to the POS terminal to facilitate execution of a settlement transaction associated with the wireless tag.

2. The communication apparatus of claim 1, wherein the determining section is configured to:
determine if the relative position of the antenna with respect to the wireless tag is a fifth position within a third range different from the first range and different from the second range;
measure a fifth phase while the relative position of the antenna with respect to the wireless tag is the fifth position;
determine if the relative position of the antenna with respect to the wireless tag is a sixth position within the third range;
measure a sixth phase while the relative position of the antenna with respect to the wireless tag is the sixth position;
determine a third phase difference between the fifth phase and the sixth phase;
determine if the third phase difference is smaller than the threshold; and
determine that the wireless tag is present outside the predetermined range while the third phase difference is smaller than the threshold.

3. A communication method between an antenna, a wireless tag, and a point-of-sale (POS) terminal, the communication method comprising:
receiving, by the antenna, a radio wave comprising a commodity code, the radio wave being transmitted from the wireless tag as the antenna moves along a plane parallel to the wireless tag;
detecting a phase of the radio wave;
determining a relative position of the antenna with respect to the wireless tag;
determining, based on the radio wave, if the relative position is a first position within a first range;
measuring a first phase while the relative position is the first position;
determining, based on the radio wave, if the relative position is a second position within the first range;
measuring a second phase while the relative position is the second position;
determining a first phase difference between the first phase and the second phase;
determining if the first phase difference is smaller than a threshold;
determining, based on the radio wave, if the relative position is a third position within a second range different from the first range;
measuring a third phase while the relative position is the third position;
determining if the relative position is a fourth position within the second range;
measuring a fourth phase while the relative position is the fourth position;
determining a second phase difference between the third phase and the fourth phase;
determining if the second phase difference is smaller than the threshold;
indexing a counter for each determination that the first phase difference is smaller than the threshold and for each determination that the second phase difference is smaller than the threshold;
determining that the wireless tag is present inside a predetermined range when the counter is greater than a counter threshold, the predetermined range being a range of settlement of the wireless tag at the POS terminal;

storing the commodity code as a settlement target commodity code while the wireless tag is present inside the predetermined range; and providing the settlement target commodity code to the POS terminal to facilitate execution of a settlement transaction associated with the wireless tag.

4. The method of claim 3, further comprising:

determining if the relative position is a fifth position within a third range different from the first range and different from the second range;

measuring a fifth phase while the relative position is the fifth position;

determining if the relative position is a sixth position within the third range;

measuring a sixth phase while the relative position is the sixth position;

determining a third phase difference between the fifth phase and the sixth phase;

determining if the third phase difference is smaller than the threshold; and determining that the wireless tag is present outside the predetermined range while the third phase difference is smaller than the threshold.

5. The method of claim 3, further comprising determining if the radio wave is received when the relative position of the antenna with respect to the wireless tag is within the first range.

6. A communication method implemented by a communication apparatus having an antenna communicable with a wireless tag and a point-of-sale (POS) terminal, the communication method comprising:

receiving, by the antenna, a radio wave transmitted from the wireless tag as the antenna moves along a plane parallel to the wireless tag, the radio wave comprising a commodity code;

determining, by the communication apparatus, a relative position of the antenna with respect to the wireless tag;

determining, by the communication apparatus, if the relative position is a first position within a first range, based on the radio wave;

measuring, by the communication apparatus, a first phase while the relative position is the first position;

determining, by the communication apparatus, if the relative position is a second position within the first range, based on the radio wave;

measuring, by the communication apparatus, a second phase while the relative position of is the second position;

determining, by the communication apparatus, a first phase difference between the first phase and the second phase;

determining, by the communication apparatus, if the first phase difference is smaller than a threshold;

determining, by the communication apparatus, if the relative position is a third position within a second range different from the first range, based on the radio wave;

measuring, by the communication apparatus, a third phase while the relative position is the third position;

determining, by the communication apparatus, if the relative position is a fourth position within the second range;

measuring, by the communication apparatus, a fourth phase while the relative position is the fourth position;

determining, by the communication apparatus, a second phase difference between third phase and the fourth phase;

determining, by the communication apparatus, if the second phase difference is smaller than the threshold;

indexing, by the communication apparatus, a counter for each determination that the first phase difference is smaller than the threshold and each determination that the second phase difference is smaller than the threshold; and determining, by the communication apparatus, that the wireless tag is present within a predetermined range while the counter is greater than a counter threshold, the predetermined range being a range for settlement of the wireless tag at the POS terminal; and storing, by the communication apparatus, the commodity code as a settlement target commodity code while the wireless tag is present inside the predetermined range; and providing, by the communication apparatus, the settlement target commodity code to the POS terminal to facilitate execution of a settlement transaction for the wireless tag.

* * * * *